United States Patent [19]

Laing et al.

[11] Patent Number: 4,516,721
[45] Date of Patent: May 14, 1985

[54] PRESSURELESS LARGE-AREA HEATING SYSTEM

[76] Inventors: Karsten Laing, Kaiserallee 51, 7500 Karlsruhe; Oliver Laing, Weissdornweg 14, 7400 Tübingen, both of Fed. Rep. of Germany; Ludwig Ludin, Kesselackerweg, 5611 Anglikon, Switzerland

[21] Appl. No.: 358,807

[22] Filed: Mar. 16, 1982

[30] Foreign Application Priority Data

Mar. 16, 1981 [CH] Switzerland ......................... 1753/81

[51] Int. Cl.³ ................................................ F24D 5/10
[52] U.S. Cl. ...................................... 237/69; 165/169; 122/26
[58] Field of Search ................... 237/69, 1 R; 126/247; 122/26; 165/49, 168, 169

[56] References Cited

U.S. PATENT DOCUMENTS

| 1,758,266 | 5/1930 | Smith | 237/69 |
| 3,720,372 | 3/1973 | Jacobs | 122/26 |
| 4,159,595 | 7/1979 | Dalle et al. | 237/1 R |
| 4,293,092 | 10/1981 | Hatz et al. | 126/247 |
| 4,344,567 | 8/1982 | Horne et al. | 237/1 R |

FOREIGN PATENT DOCUMENTS

| 2807970 | 8/1979 | Fed. Rep. of Germany | 237/69 |
| 587457 | 4/1977 | Switzerland | 237/69 |

*Primary Examiner*—Henry Bennett
*Attorney, Agent, or Firm*—Pennie & Edmonds

[57] ABSTRACT

A heating system including a hollow body having a part of a low pressure and low temperature heating circuit therein. The hollow body has a plurality of parallel juxtaposed fluid channels formed by a pair of spaced thermoplastic wall members connected by webs to form the channels. A plurality of the channels are connected to an inlet manifold and to an outlet manifold whereby the flow of fluid in said channels is parallel over substantially the complete area of the wall members.

4 Claims, 11 Drawing Figures

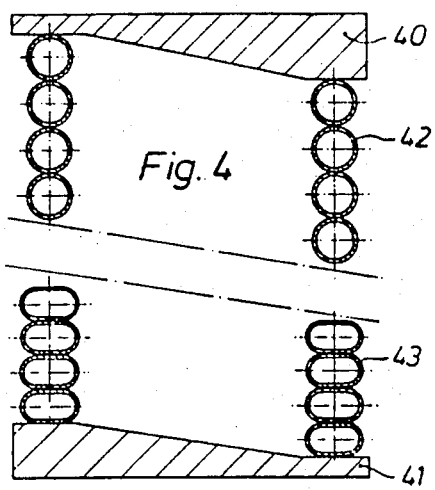
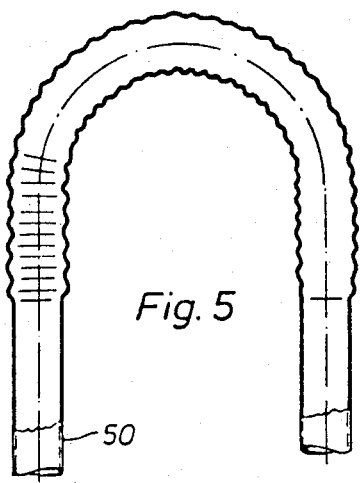
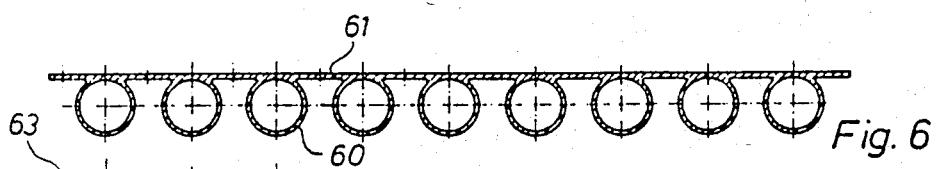
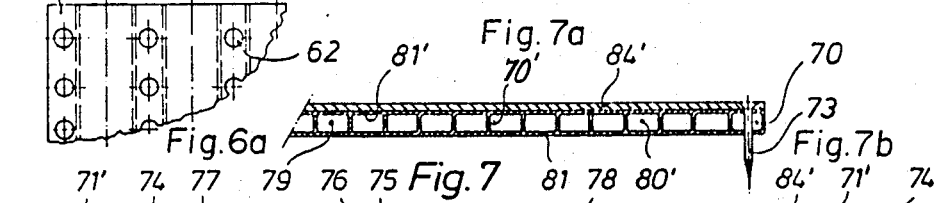
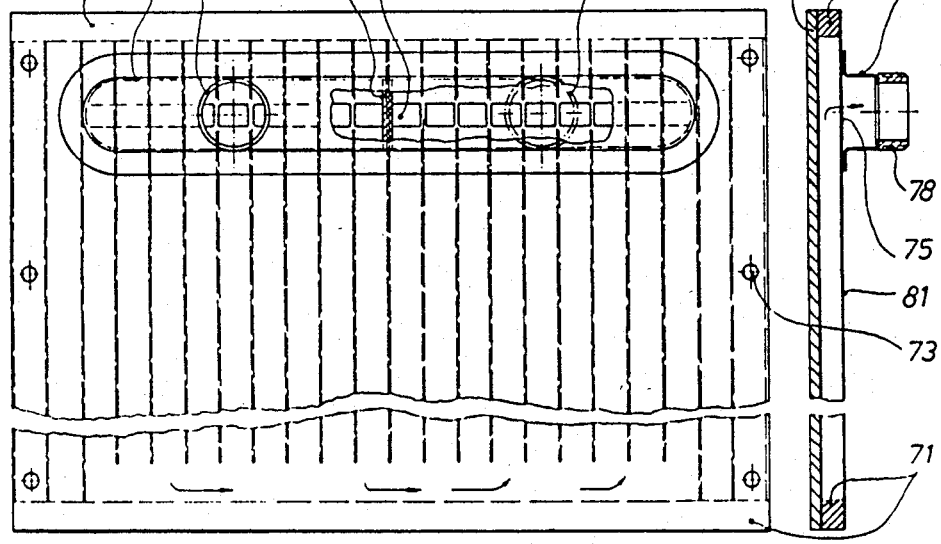

PRESSURELESS LARGE-AREA HEATING SYSTEM

The invention relates to a large-area heating system having heat transfer elements consisting of extruded hollow bodies, and also comprising pumps.

For a floor, wall or ceiling heating system, it is known to use plastic pipes which do not corrode but which, like all organic materials, allow gases to pass through them.

Since oxygen dissolves in water, there is a constant increase in the concentration of oxygen. This oxygen leads to corrosion damage in the boiler and in the heating system. Like all plastic materials, these pipes also have a tendency to form cold cracks in course of time so that the pipes may start to leak. Cold crack formation or fissuring is an outcome of high specific deformation. Specific deformation in turn depends upon the wall thickness of the pipes and on the bending radius. It is true that in the electrical installation industry, synthetic plastic pipes are known which have very thin walls but which are corrugated so that such pipes can be laid in very narrow curves without any notable specific deformation.

The invention for the use of thin gauge hollow bodies which are substantially cheaper than currently available plastic pipes and the laying of which is substantially less wage intensive than that of rigid thick-gauge pipes.

What is more, competitively priced pipes can be laid closer together so that heating up occurs with virtually no delay. For large area heating systems, thin gauge hollow bodies or even rubber tubes have so far been unsuccessful since they cannot cope with the pressure of the heating water.

In order to avoid the above-mentioned disadvantages, it is envisaged to isolate the heat carrier circuit of the large area heating system from the low heat capacitance conveyor, so that the large area heating system-heat carrier circuit operates on a virtually pressureless basis.

Particularly in conjunction with remote heating systems, heating installations have become known in which a heat exchanger is provided. Such heat transfer means do however involve the use of considerable material and have a disturbingly high heat capacitance. Furthermore, the circulating pump not only has to overcome the friction resistance in pipes laid, for instance, in the ground but also resistance in the system of pipes in the heat conveyor. As a result, the annual power consumption increases substantially.

Therefore, the invention provides for large area heating systems heat exchangers which can be produced at very low material expense, and which therefore have a low heat capacitance and which do not create additional resistance so that they operate in an energy-saving fashion. According to the invention, this is achieved in that the surface of the actual heat conveyor, e.g. a nest of pipes, is exposed to the mechanical action of the pump, so that the convective heat transfer on the heat-providing side of the heat conveyor pipes can assume the same values as on the heat absorbing side, so that the transfer of heat is at a very high level due to the high throughflow velocity of the heat carrier on the heating circuit side.

The invention resides therefore in employing thin-gauge hollow bodies and of operating these in such a way that they are hydraulically separated by a heat exchanger from the pressurised hot water system. A particularly favourable embodiment provides a heat conveyor which is combined with the recirculating pump to form one unit. In addition, a heating resistor can be disposed in the heat conveyor base.

The invention will be explained in greater detail hereinafter with reference to the accompanying drawings, in which:

FIG. 4 shows a step in the procedure for producing the nest of pipes;

FIG. 5 shows a floor heating pipe with corrugations;

FIG. 6 shows an extruded heating element as a large-area heating system;

FIG. 6a is a plan view of a portion of the heating element of FIG. 6;

FIG. 7 shows an extruded panel, and

FIG. 7a is a top sectional view of the panel of FIG. 7;

FIG. 7b is a side sectional view of the panel of FIG. 7;

Figure 1:
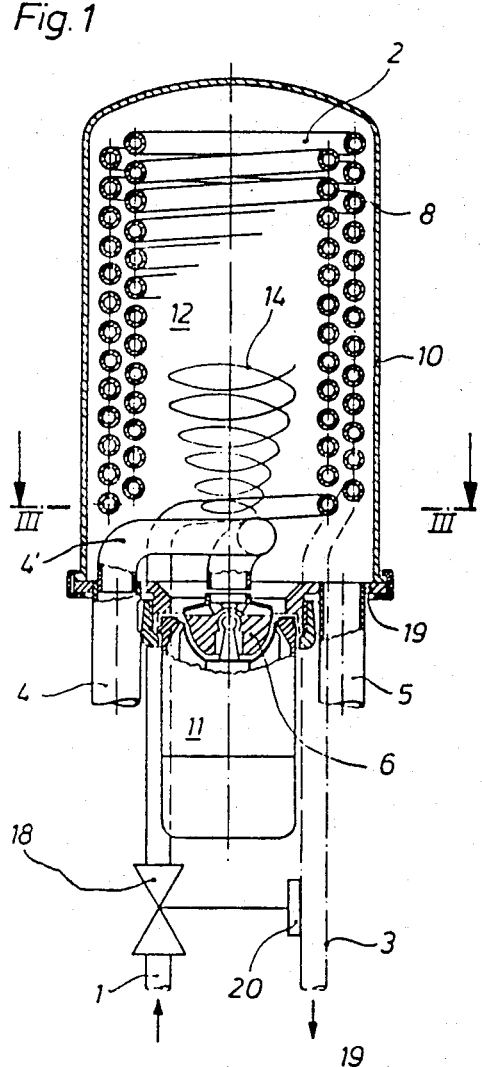
FIG. 1 shows a longitudinal section through a pump according to the invention, in which heating water is passed through a nest of pipes disposed in the cylindrical outlet chamber of the pump.

FIG. 1 shows that the water of the heating circuit which is recirculated by a heating pump, enters the nest of tubes 2 through the pipe 1 and leaves it through the pipe 3. The nests of tubes are disposed concentrically in a cylindrical pump housing 10 close to the outer periphery thereof so that a cylindrical inner space 12 remains. The large area heating system is connected to the pump 11 via the pipes 4 and 5. The flow velocity at the surface of the nests of pipes amounts to 0.5 to 3 m per second, because despite the large cross-section of the housing 10, a high relative velocity is generated parallel with the nest of pipes 2, because the pump impeller 6 is so disposed that the outlet twist 14 above the nest of pipes 8 developing in the same direction of rotation is propagated upwardly. As a result of the high relative velocity of the liquid in relation to the nest of pipes 2, the high heat transference is assured and therefore only a short pipe length and a small housing 10 are required for the nest of pipes 2.

Figure 2:
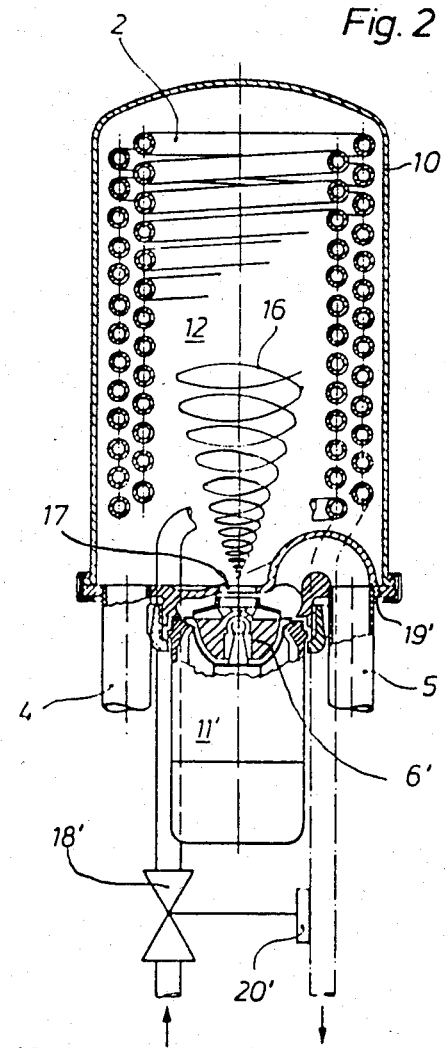
FIG. 2 shows an arrangement in longitudinal section, in which the nest of pipes is disposed in the intake chamber of the pump.

In the case of the embodiment in FIG. 2, the suction zone 17 of the impeller 6' communicates with the interior of the housing 10 and in this way generates a helical flow 16 on the intake side.

Figure 3:
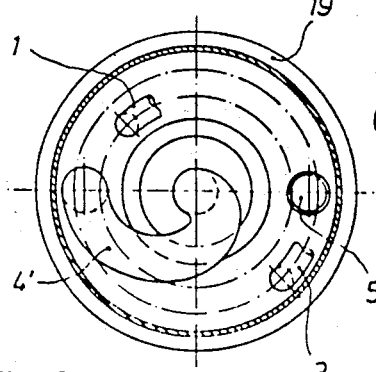
FIG. 3 shows a section taken on the line III—III.

FIG. 3 shows a cross-section along the line III—III in FIG. 1. The intake line 4 extends spirally, so that the helical flow suffers only minimal resistance. All connections 1, 3, 4 and 5 lead through the bottom 19.

Heat transfer through relatively large surface areas can be improved for the same length of pipe nests if the heat transfer pipes are constructed with a flat cross-section. According to the invention, to this end the nest of pipes is shaped from round pipe 42 by conventional production methods. Subsequently, the nest of pipes is compressed together axially so that all pipes regularly acquire a long-round cross-section 43.

FIG. 4 shows an apparatus in which two mouldings 40 and 41 are run together under a press, not shown, so that the pipe is formed for the nest of pipes. Once the flattened nest of pipes has been removed from the apparatus, it must be axially stretched a small amount so that a gap is left between adjacent turns.

FIG. 5 shows a per se known thin-gauge corrugated pipe which, according to the invention, is used in conjunction with the heat exchange pump as a floor heating system. Those areas which are not bent are preferably constructed as a smooth pipe 50.

FIG. 6 shows the cross-section through pipes 60 which are simultaneously extruded and which are connected to one another by webs 61. As the plan view shows, these webs are subsequently provided with apertures 62. In the areas 63, they can be clinched together and through the apertures 62, the cover coating of the floor structure can be glued to the layer underneath. At one end, the even pipes 60 can be connected to the feed and the uneven pipes to the return. At the other end, in each case the even pipes are connected via angles or via a common manifold to the uneven pipes.

FIG. 7 shows, constructed as a double web panel and likewise produced by extrusion, a panel-like floor heating system. Juxtiposed channels 70 are formed by a pair of spaced wall members 81, 81' connected by webs 70'. The channels 70 can have nails 73 passing through them for fixing purposes. At their ends, the panels are sealed by being fused together or by having strips 71 glued in. At one end, a trough-shaped collector 74 is welded or glued onto the side of the panel. This collector 74 has in the middle a partition 76 by which the feed zone with the connector 77 is separated from the return zone with the connector 78 to form inlet and outlet manifolds.

Provided inside the trough 74 are apertures 75 through the bottom wall member 81 so that the passages 79, where they are not traversed by nails 73, communicate with the interior of the trough 74. Wherever a dynamic pressure develops in the passage element 74, the cross-sections of the apertures 75 are smaller than in the other zoes, so ensuring a regular throughflow in all passages 79, 80'. The heat carrier water enters through the connector 77 and leaves the large area heating panel via the connector 78. At the other end of the large area heating panel, the assembly of passages 79 which communicates with the connector 77 are connected to the assembly of channels 80' which communicate with the connector 78. For this, it is necessary prior to sealing the panel with the strip 71, to cut out the webs 82' over the width of the connecting passage 83'. For better load distribution, the panel is provided with an overlay 84' of hard material and steel plate in particular is suitable for this purpose.

Figure 8:
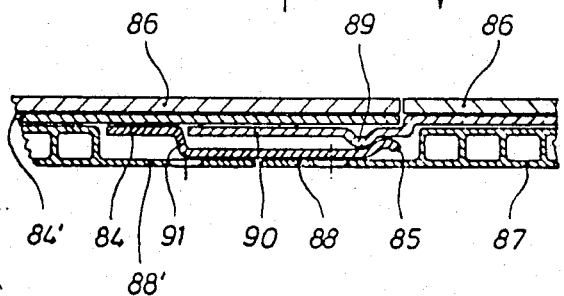
FIG. 8 shows a panel according to FIG. 7, with a sheet metal overlay.

FIG. 8 shows the edge construction. Along the right-hand edge, the marginal strip 90 is stepped by the thickness of the plate and has in it a corrugation 89. On the left-hand edge, an angle profile 91 along the seam 34 is inseparably connected to the steel plate overlay 84'. Also this angle profile has a corrugation 85 which form-lockingly holds the corrugation 89. The width of the profile corresponds to the width of the marginal strip 90 so that two adjacent panels can be fixed to each other in such a way as to be fixed and resistant both to compression and to tension. The floor covering 86 is glued onto the steel plate overlay. In the edge zone, the double web panel 8 has strips 88 which serve for nailing.

For the double web panels, it has proved to be ideal to use a stickably hydrolysis-resistant material, e.g. PPO, blended with polystyrene or other plastic material. It is also advantageous, between the web panel and the steel plate overlay, to provide a layer of a viscous non-evaporating liquid or a non-hardening paste, so that shearing forces between the sheet metal overlay and the floor are increased.

We claim:

1. A large-area heating system having a passage forming a hollow body through which a first heat carrier having a relatively low pressure and low temperature is adapted to flow and capable of being integrated into ceilings, walls or floors, a pump for circulating said first heat carrier through said passage, said pump and said passage forming part of a first heat carrier circuit, a second heat carrier circuit through which a second heat carrier having a higher pressure and a higher temperature than said first heat carrier is adapted to flow, and a heat exchanger for exchanging heat relatively between said first and said second heat carriers, characterized in that said passage comprises a plurality of parallel juxtaposed channels formed by a pair of spaced thermo-plastic wall members connected by a plurality of parallel extending webs to form a panel with a plurality of the channels being connected to an inlet manifold and to an outlet manifold whereby flow of said first heat carrier is in parallel through a plurality of said channels and whereby substantially the complete area of the wall members is contacted by said first heat carrier.

2. A large-area heating system according to claim 1 further characterized in that said inlet and outlet manifolds are positioned on the same end of the panel.

3. A large-area heating system according to claim 1 further characterized in having a protective cover plate adjacent a wall member facing a space where heat is to be exchanged.

4. A large-area heating system according to claim 1 further characterized in that said pump comprises a centrifugal pump to circulate said first heat carrier with a swirl motion over a portion of the second heat carrier circuit having a coil extending in the same direction as the swirl to improve heat exchange efficiency between said first and said second heat carriers.

* * * * *